(12) United States Patent
Mooney

(10) Patent No.: US 7,654,006 B1
(45) Date of Patent: Feb. 2, 2010

(54) METHOD AND DEVICE FOR ELEVATOR RAIL ALIGNMENT

(76) Inventor: Bret Mooney, 4517 Carnaby Ct., San Jose, CA (US) 95136

( * ) Notice: Subject to any disclaimer, the term of this patent is extended or adjusted under 35 U.S.C. 154(b) by 189 days.

(21) Appl. No.: 11/851,467

(22) Filed: Sep. 7, 2007

(51) Int. Cl.
*G01B 11/26* (2006.01)

(52) U.S. Cl. .................................................. 33/286

(58) Field of Classification Search ............... 33/286, 33/287, 288, 412, DIG. 21
See application file for complete search history.

(56) References Cited

U.S. PATENT DOCUMENTS

| | | | | |
|---|---|---|---|---|
| 420,245 | A * | 1/1890 | Rose | 33/287 |
| 2,763,931 | A * | 9/1956 | McMillan | 33/287 |
| 4,593,794 | A | 6/1986 | Russeau | |
| 5,848,476 | A * | 12/1998 | Grady | 33/1 Q |
| 6,052,911 | A * | 4/2000 | Davis | 33/286 |
| 6,374,507 | B1 * | 4/2002 | Lehto | 33/645 |
| 6,438,854 | B1 * | 8/2002 | Kott, Jr. | 33/286 |
| 6,453,568 | B1 * | 9/2002 | Hymer | 33/276 |
| 6,457,246 | B1 * | 10/2002 | Frazer et al. | 33/286 |
| 6,732,439 | B1 * | 5/2004 | Radke et al. | 33/286 |
| 6,739,062 | B2 * | 5/2004 | Jan et al. | 33/286 |
| 6,931,738 | B2 * | 8/2005 | Bodgren et al. | 33/286 |
| 7,024,780 | B2 | 4/2006 | Pfenniger | |
| 7,137,209 | B2 * | 11/2006 | Northern et al. | 33/371 |
| 2002/0062570 | A1 * | 5/2002 | Palumbo et al. | 33/286 |

* cited by examiner

*Primary Examiner*—Christopher W Fulton
(74) *Attorney, Agent, or Firm*—Schneck & Schneck

(57) ABSTRACT

A method and device for elevator rail point alignment. A device body has a rear rail clamp and a front, angle alignable laser device. The laser mount provides for inversion alignment. In use, the device can be simply brought into true aim by focusing on an opposite target and marking the beam spot, inverting the tool on a aim and marking a second beam spot, and reaiming the laser to an intermediate spot.

9 Claims, 2 Drawing Sheets

METHOD AND DEVICE FOR ELEVATOR RAIL ALIGNMENT

TECHNICAL FIELD

The present invention relates to elevator installation and more specifically a device for accurately pointing elevator rails.

BACKGROUND ART

A number of factors have led to the development of high performance elevators. Taller buildings and increased passenger traffic requires efficient elevator systems to convey passengers between floors. This requires advanced, faster elevators with a sophisticated system for powering and controlling the elevator. This has resulted in elevators having ever increasing vertical operating speeds. However, such faster travel speeds have led to a number of technical challenges. One such technical challenge is the need for precisely aligned guide rails. These guide rails, upon which the elevator cars move vertically, must be aligned to exacting tolerances. If the opposing rails are not aligned this could be detected by passengers riding in the elevator car as vibration. This may result in passenger discomfort and wear and tear on elevator parts.

To alleviate these problems in elevator operation, the rails must be positioned as linear and parallel to one another as is practical. A number of different devices have been employed to ensure proper orientation of the elevator rails on the vertical services within elevator shafts. In one common technique, a plumb line may be hung adjacent to the brackets onto which the guide rails are mounted. This plumb line may then be used to ensure proper orientation of the rail from top to bottom. This is referred to as "plumb alignment".

A second device may be used to ensure orientation of the point of the rails. This ensures that each elevator guide rail is positioned such that it properly faces the opposite guide rail. This is referred to as "point alignment".

U.S. Pat. No. 4,593,794 provides an illustration of one such rail orientation device. The term used herein to describe the pointing of rails such that they face each other is "point leveling".

U.S. Pat. No. 4,593,794 discloses an apparatus for installing elevator rails in a linear and parallel orientation. The device disclosed includes a pair of mirror image guide clamps which each attach to one opposite rail. These guide assemblies have a reference notch which positions the rail relative to an adjacent plumb line. The device also includes an inner connecting guideline which ensures that the point orientation of the rails of the rail clamp location is aligned. This requires attaching a guide to each rail and having a string extend between the two guides. Thus for proper rail point alignment at least two guides must be clamped to opposite rails, a string extends across the elevator shaft, and additional tools are required for plumb alignment. The combination of multiple clamps and multiple strings allows both plumb and point alignment using this tool.

A number of drawbacks exist for the use of string-based alignment. First, the alignment of point requires a rail installer to move back and forth between the two rails making multiple adjustment to each string guide. Secondly, the string is somewhat cumbersome. The string extends across the elevator shaft and the installers must move around a string extending across the elevator shaft.

One of the present objects is to design a elevator rail point alignment tool that requires only one device be attached to a rail for point alignment.

SUMMARY OF THE INVENTION

The above objects and other objects are achieved with a device for point alignment of elevator rails. This device includes a rail clamp body on which a laser mount is attached. A laser is mounted on the laser mount. The laser mount also includes means for adjusting the laser mount. This means for adjusting the laser mount may be configured to allow for inversion calibration. In some embodiments, the means for adjusting the laser mount may include an adjustable spring tensioning device and a central pivot attaching the laser mount to the rail clamp body. In some embodiments the means for adjusting the laser mount may include a locking fastener on the laser mount mounted in a track. In other embodiments the rail clamp body may include an adapter configured to allow the device to be used on rails having differing thicknesses.

Another embodiment of the invention is a method for adjusting the laser level. This method would include clamping a laser level to a vertical rail and activating the laser level such that the laser level is upright and horizontal and directed onto a second elongate vertical rail. The beam spot would be directed onto a flat vertical surface of a rail preferably at a rail clamp location. The location of the initial beam spot is marked on the second rail and then the laser level is inverted. The new beam spot location is marked on the second rail and the laser aim is adjusted such that the beam spot is located between the first and second marked spot locations. This new intermediate spot is then marked and the laser level is once again inverted. If the device has been properly aligned the beam spot will remain at this third beam mark location. If not, the laser level may once again be inverted the new spot marked and the device further adjusted.

DETAILED DESCRIPTION

Figure 1:
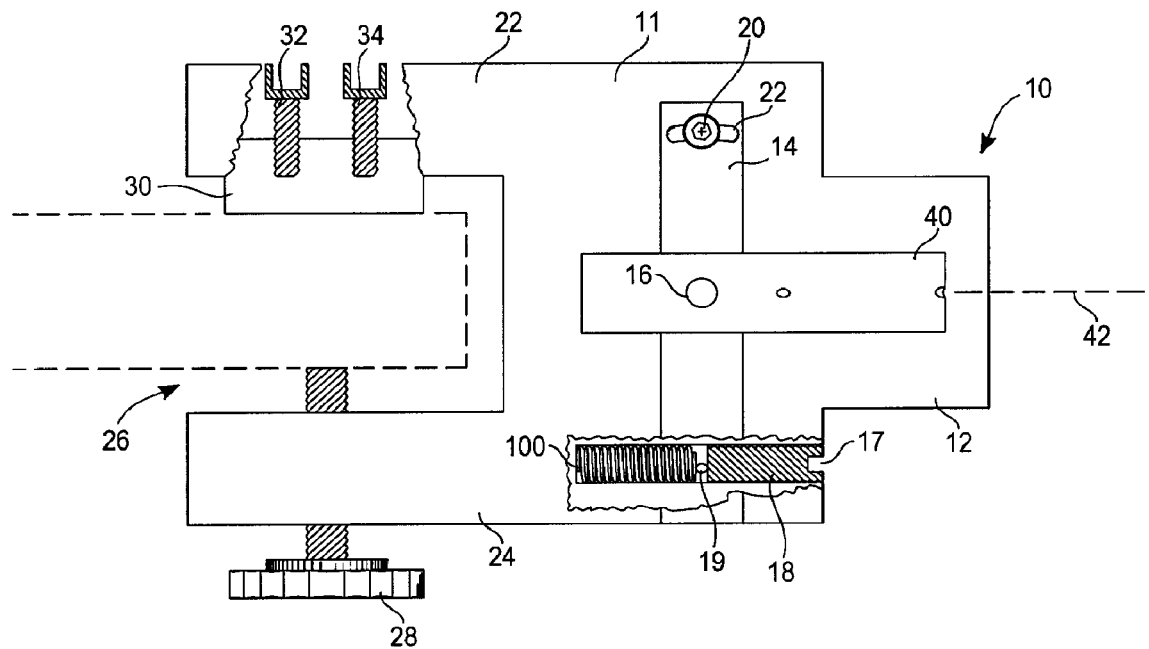
FIG. 1 is a top view of an embodiment of the point laser level alignment tool.

With reference to FIG. 1 the laser alignment tool 10 includes a rail clamp body 11 onto which other elements are mounted. A nose section 12 on rail clamp body 11 projects providing a laser support surface. Mounted onto rail clamp body 11 is a laser mount 14. Laser 40 is mounted to laser mount 14 at the location of attachment 16 which attaches laser 40 to mount 14. The laser 40 is fixedly mounted to laser mount 14 such that the longitudinal axis of laser 40 is substantially perpendicular to laser mount 14. Laser mount 14 is attached to a floating pin 19 that extends into an internal cavity (shown in cutaway) in block 12. A spring 100 is set into a blind hole and biases one side of pin 19. An Allen screw 18 having adjustment head 17 is driven into a threaded hole in block 12 below laser mount 14 and pushes against an opposite side of pin 19.

At the opposite end of laser mount 14 is a adjustment arc track 21 which extends through laser mount 14. An adjustment lock fastener 20 extends through adjustment arc track 21 and may be bolted into rail clamp body 11. Adjustment lock fastener 20 may be loosened allowing pivoting of laser mount 14. From this configuration it should be apparent how the laser might be adjusted. Adjustment lock fastener 20 may be loosened and the laser mount 14 would pivot on pivot 16 changing the aim of laser beam 42 emitted by laser 40. This would allow side to side adjustment of a beam aim. The tensioner would allow more simplified incremental movement of laser mount 14. Adjustment screw 17 may be tightened, increasing the tension of spring tensioner 18.

A number of alternative means for adjusting the laser mount are possible. For example, a ring group of pins on laser mount 14 could be received into a ring group of holes in rail clamp body 11. This would allow physical manual adjustment of the laser mount. Alternatively, various ratcheting mechanisms, magnetic mechanisms, and other adjustment means are contemplated.

Figure 2:
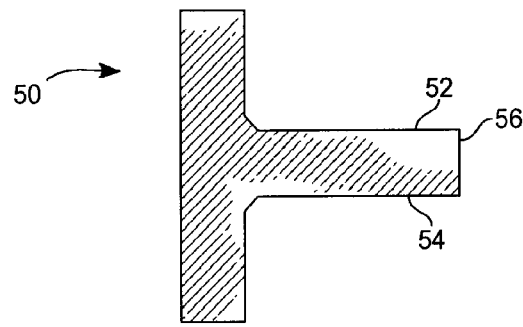
FIG. 2 is a cross sectional view of an elevator rail.

Rail clamp body 11 also has a first rail mount arm 22 and a second rail mount arm 24 which define a rail receiving space 26. This is the location where the alignment tool 10 is secured to an elongate elevator rail. With reference to FIG. 2 the elongate rail 50 is shown in cross section. The present device is clamped between the face 52 and face 54. An opposite rail has a flat surface 56 onto which the laser is aimed.

Returning to FIG. 1, to allow tightening to the rail knob 28 is received through a threaded hole extending through second mount arm 24. This allows knob 28 to be rotatably tightened against the rail. Alternative clamping devices including spring mounted pins and other fasteners may be used.

Because the elongate rails may be of different sizes an adapter may be fitted into the rail clamp body 11. In FIG. 1, rail size adapter 30 is shown secured onto rail clamp body 11 by adapter mount bolts 32, 34. Adapter 30 is mounted on first rail mount arm 22 opposite the knob 28 mounted on second rail mount arm 24. Thus when the alignment tool 10 is mounted on a rail the laser is centered on the tool at the rail center.

Figure 3:
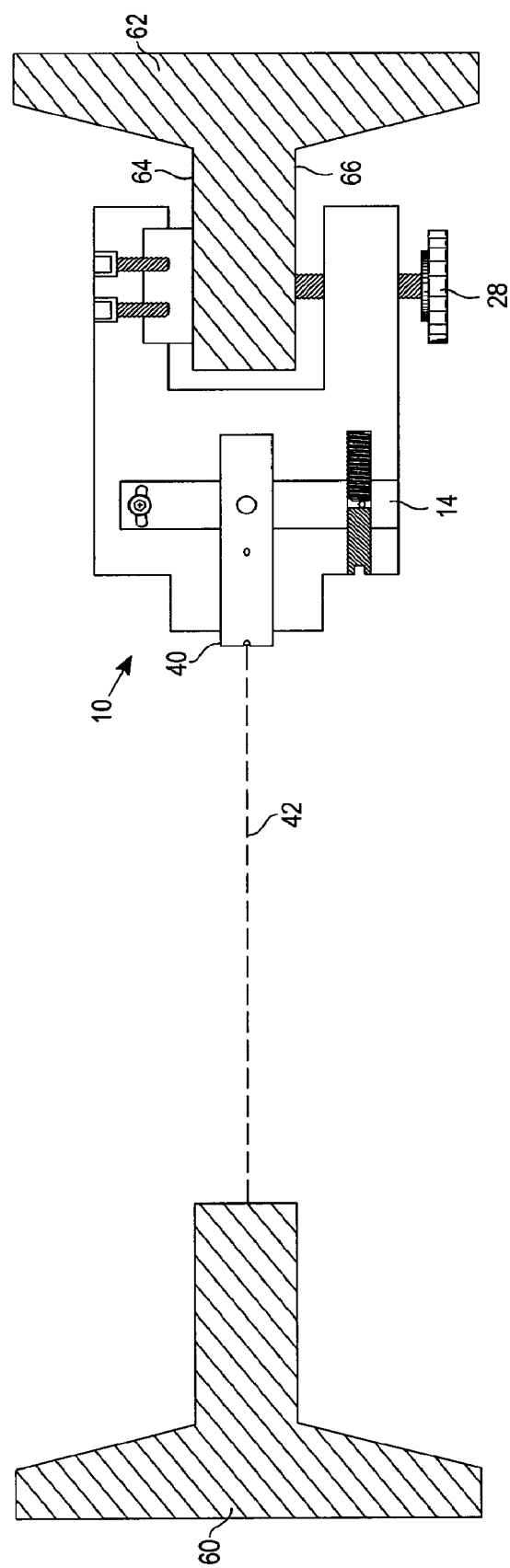
FIG. 3 is a top view of a laser level tool shown mounted on a rail cross section with a beam generated by the laser level tool directed at a second rail.

The present tool is used to align elevator t-rails, specifically point alignment of elevator t-rails. The tool does not align or position the rails in the hoistway. Plumb alignment may be performed with a number of other tools, including plumb lines. Instead, the present tool is used to point rails at each other. With the present adapter the present alignment tool may be used on a number of different sizes of elevator t-rails. Different adapter blocks may be exchanged to accommodate a variety of different size rails. The primary purpose of this tool is to align the face of a king t-rail parallel to the face of a queen t-rail. Aligning the face of both t-rails parallel to each other is referred to throughout as point alignment. With reference to FIG. 3, a king rail 52 and queen rail 60 are shown. The alignment tool 10 is mounted to king rail 62 on faces 64, 66 the laser 40 mounted on laser mount 14 produces laser beam 42 directed at target surface 61 on queen rail 60.

In the alignment process, first the correct adapter is inserted into the rail clamp body. The adapters selected for the thickness of the rail that is being aligned. This will ensure that the laser spot on the center line of the post on the opposite rail is correctly centered.

The alignment tool is clamped such that the laser is upright and horizontal on king rail 62 as shown. The device is turned on and the location of the laser dot on the queen rail is marked. The tool is then inverted 180%, resecured to the king rail 62 and the new position of the laser spot on the queen rail is marked. If the first spot location is different from the second spot aim is adjusted the adjustment screws are loosened and the laser is repainted such that the spot is at a third position halfway between the first and the second position. The screw is retightened and clamp is once again inverted. If the laser spot does not change from this third position then the laser is aimed true and parallel to the face of the rail that its clamped onto. If the laser spot is in a different position the laser is again realigned by marking the spot and moving to halfway between this fourth spot and the third spot.

Once the laser has been properly adjusted and centered it is clamped onto the king rail and turned on. The king rail is then positionally adjusted on its mounting fasteners until the laser dot is in the center of the queen rail post face. At this point the rail bracket is tightened. The alignment tool is then taken off of the king rail and moved onto the queen rail where the laser is upright and horizontal. The queen rail is then turned until the laser dot is in the center of the king rail post and then the queen rail is tightened onto the rail bracket. The alignment tool may then be moved back to the king rail to verify accuracy and then back to the queen rail to verify accurate of point alignment.

What is claimed is:

1. A device for point alignment of elevator rails comprising:
   a rail clamp body;
   a laser mount on said rail clamp body;
   a laser mounted on said laser mount;
   a means for adjusting said laser mount;
   a rail mount on said rail clamp body; and
   a clamp on said rail mount configured to allow said rail clamp to be securely attached to an elevator rail, wherein said laser is mounted centered on said rail clamp body such that rail clamp attachment to the elevator rail and inversion of such attachment both provide that the laser be at the rail center so that the angle of the laser may be aligned perpendicular to the rail by inversion adjustment.

2. The device of claim 1, wherein said rail mount includes a first rail mount arm and a second rail mount arm.

3. The device of claim 1, further comprising an adapter mounted within the rail mount on said rail clamp body, said adapter configured to allow said device and its laser to be centered on different sized rails.

4. The device of claim 1, wherein said means for adjusting said laser mount is configured to allow inversion calibration.

5. The device of claim 1, wherein said means for adjusting said laser mount includes a track mounted locking fastener on said laser mount and a central pivot.

6. A device for point alignment of elevator rails comprising:
   a rail clamp body;
   a laser mount on said rail clamp body;
   a laser mounted on said laser mount;
   a means for adjusting said laser mount;
   a rail mount on said rail clamp body; and
   a clamp on said rail mount configured to allow said rail clamp to be securely attached to an elevator rail, wherein said laser is mounted on said rail clamp body such that it may be aligned by inversion adjustment wherein said means for adjusting said laser mount includes an adjustable spring tensioner and a central pivot attaching the laser mount to the rail clamp body.

7. A device for point alignment of elevator rails comprising:
   a rail clamp body;
   a laser mount on said rail clamp body;
   a laser mounted on said laser mount;
   a central pivot attaching said laser mount to said rail clamp body;
   an adjustable spring tensioner on a first end of said laser mount;
   a track mounted locking fastener mounted on a second end of said laser mount, said second end opposite said first end;

a rail mount on said rail clamp body; and a clamp on said rail mount configured to allow said rail clamp to be securely attached to an elevator rail, wherein said laser is mounted on said rail clamp body such that it may be centered by inversion adjustment.

8. The device of claim 7, further including an means for rail adapting on said rail mount.

9. A method of adjusting a laser level comprising:
(a) clamping a laser level to a first elongate, vertical rail;
(b) activating said laser level such that said laser level is upright and horizontal and directed onto a second elongate, vertical rail;
(c) marking a first beam spot location on said second rail;
(d) inverting said laser level;
(e) marking a second beam spot location on said second rail;
(f) adjusting laser aim of said laser lever to a third laser beam spot location halfway between said first beam spot location and said second beam spot location;
(g) marking said third beam spot location;
(h) inverting said laser level; and
(i) confirming that a beam spot from said laser level remains at said third laser beam spot location, if not, repeating steps (d)-(i).

* * * * *